(12) United States Patent
Robinson

(10) Patent No.: US 9,432,735 B2
(45) Date of Patent: Aug. 30, 2016

(54) SYSTEMS AND METHODS FOR TIMING THE RECORDING AND PLAYBACK OF TELEVISION PROGRAMMING

(71) Applicant: ECHOSTAR UK HOLDINGS LIMITED, Steeton, Keighley (GB)

(72) Inventor: David Robinson, Keighly (GB)

(73) Assignee: ECHOSTAR UK HOLDINGS LIMITED (GB)

( * ) Notice: Subject to any disclaimer, the term of this patent is extended or adjusted under 35 U.S.C. 154(b) by 70 days.

(21) Appl. No.: 14/326,022

(22) Filed: Jul. 8, 2014

(65) Prior Publication Data

US 2016/0014458 A1    Jan. 14, 2016

(51) Int. Cl.

| | |
|---|---|
| *H04N 9/80* | (2006.01) |
| *H04N 5/76* | (2006.01) |
| *H04N 21/458* | (2011.01) |
| *G11B 27/00* | (2006.01) |
| *G11B 27/10* | (2006.01) |
| *H04N 21/4147* | (2011.01) |
| *H04N 21/433* | (2011.01) |
| *H04N 21/472* | (2011.01) |

(52) U.S. Cl.
CPC ......... *H04N 21/4583* (2013.01); *G11B 27/005* (2013.01); *G11B 27/10* (2013.01); *H04N 5/76* (2013.01); *H04N 21/4147* (2013.01); *H04N 21/4334* (2013.01); *H04N 21/47202* (2013.01); *H04N 21/47214* (2013.01)

(58) Field of Classification Search
CPC ..................... H04N 21/4583; H04N 21/4147; H04N 21/4334; H04N 21/47202; G11B 27/10; G11B 27/005

USPC ................ 386/241, 240, 291, 292, 296, 298
See application file for complete search history.

(56) References Cited

U.S. PATENT DOCUMENTS

| | | | |
|---|---|---|---|
| 7,356,246 B1 | 4/2008 | Kobb | |
| 2007/0092204 A1 | 4/2007 | Wagner et al. | |
| 2009/0245758 A1 | 10/2009 | Kodama et al. | |
| 2012/0294591 A1* | 11/2012 | Alexander | H04N 5/782 386/292 |
| 2013/0247111 A1* | 9/2013 | Templeman | H04N 5/782 725/55 |
| 2013/0311575 A1 | 11/2013 | Woods et al. | |

OTHER PUBLICATIONS

International Search Report and Written Opinion for PCT/GB2015/051969 mailed Sep. 29, 2015, 13 pages.

* cited by examiner

*Primary Examiner* — Robert Chevalier
(74) *Attorney, Agent, or Firm* — Kilpatrick Townsend & Stockton LLP

(57) ABSTRACT

Various arrangements are presented for recording broadcast television programming. An electronic programming guide database may be accessed to determine a scheduled start time and a scheduled end time for the broadcast television program. A timer may be defined to record the broadcast television program. The start time for the timer may be a first predefined period of time before the scheduled start time of the broadcast television program and an end time for the timer may be a second predefined period of time after the scheduled end time of the broadcast television program. The broadcast television program may be recorded, the recording beginning at the start time of the timer and ending at the end time of the timer. One or more bookmarks that are based on the scheduled start time and/or scheduled end time of the broadcast television program may be created for the recorded television program.

17 Claims, 8 Drawing Sheets

SYSTEMS AND METHODS FOR TIMING THE RECORDING AND PLAYBACK OF TELEVISION PROGRAMMING

BACKGROUND

Television programs are often broadcast starting at a time other than the scheduled broadcast time. For instance, a television program scheduled to be broadcast at 8:00 PM may begin being broadcast several minutes early or late. Similarly, television programs may end at a time other than the scheduled end time, such as several minutes early or late. Further, some types of events, such as sporting events, may tend to run significantly longer than the scheduled broadcast time. For instance, a sporting event that goes into extra innings or overtime may extend well beyond the scheduled end time of the broadcast of the sporting event. Such variations in the actual broadcast time of a television program from the scheduled broadcast time may be of consequence to a user when the user is attempting to record the broadcast of the television program. For instance, a user likely would not desire a portion of the television program to be missed from the recording simply because the broadcast started early, late, or ran over its allotted broadcast time.

SUMMARY

Embodiments detailed herein may be implemented as methods, systems, devices, and computer-readable mediums that contain instructions executed by one or more processors. Embodiments may be used for recording broadcast television programming. A selection of a broadcast television program from an electronic programming guide may be received. An electronic programming guide database may be accessed to determine a scheduled start time and a scheduled end time for the broadcast television program. A timer may be defined to record the broadcast television program in response to receiving the selection of the broadcast television program from the electronic programming guide. A start time for the timer may be a first predefined period of time before the scheduled start time of the broadcast television program. An end time for the timer may be a second predefined period of time after the scheduled end time of the broadcast television program. The broadcast television program may be recorded, the recording beginning at the start time of the timer and ending at the end time of the timer. A first bookmark may be created and stored in association with the recording, the first bookmark being based on the scheduled start time of the broadcast television program.

Various embodiments may include one or more of the following features: A command from a user requesting playback of the recorded broadcast television program may be received. Playback of the recorded broadcast television program may be initiated at a time with the recording associated with the first bookmark. For the recorded broadcast television program, a second bookmark may be defined that indicates the scheduled end time of the broadcast television program. Playback of the recorded television program may continue to the scheduled end time indicated by the second bookmark. While continuing playback of the recorded television program, based on the second bookmark, a visual indication may be output for presentation that indicates that playback will end. Playback of the recorded television program until may continue to the scheduled end time indicated by the second bookmark. At the scheduled end time indicated by the second bookmark, playback of the recorded television program may pause. A user interface may be output for presentation indicating whether playback of the recorded television program is to continue. After initiating playback of the recorded broadcast television program at the scheduled start time based on the first bookmark, a rewind command may be received. In response to the rewind command, a portion of the recorded broadcast television program that is prior to the scheduled start time indicated by the first bookmark may be output. A user may define the first predefined period of time and the second predefined period of time. The first predefined period of time and the second predefined period of time may be of a same duration. A command from a user may be received requesting playback of the recorded broadcast television program. Playback of the recorded broadcast television program may be initiated based on the first bookmark, wherein the playback occurs before the scheduled start time based on a predefined playback offset time. Storing the first bookmark may include storing the first bookmark to a file separate from the recorded broadcast television program.

Further, in various embodiments, an offset in lieu of a bookmark may be used: A selection of a broadcast television program may be received from an electronic programming guide. An electronic programming guide database may be accessed to determine a scheduled start time and a scheduled end time for the broadcast television program. A timer to record the broadcast television program may be defined in response to receiving the selection of the broadcast television program from the electronic programming guide. A start time for the timer may be a first predefined period of time before the scheduled start time of the broadcast television program. An end time for the timer may be a second predefined period of time after the scheduled end time of the broadcast television program. The broadcast television program may be recorded as a recording, the recording beginning at the start time of the timer and ending at the end time of the timer. Playback may be initiated at a byte count into the recording based on a defined offset value.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
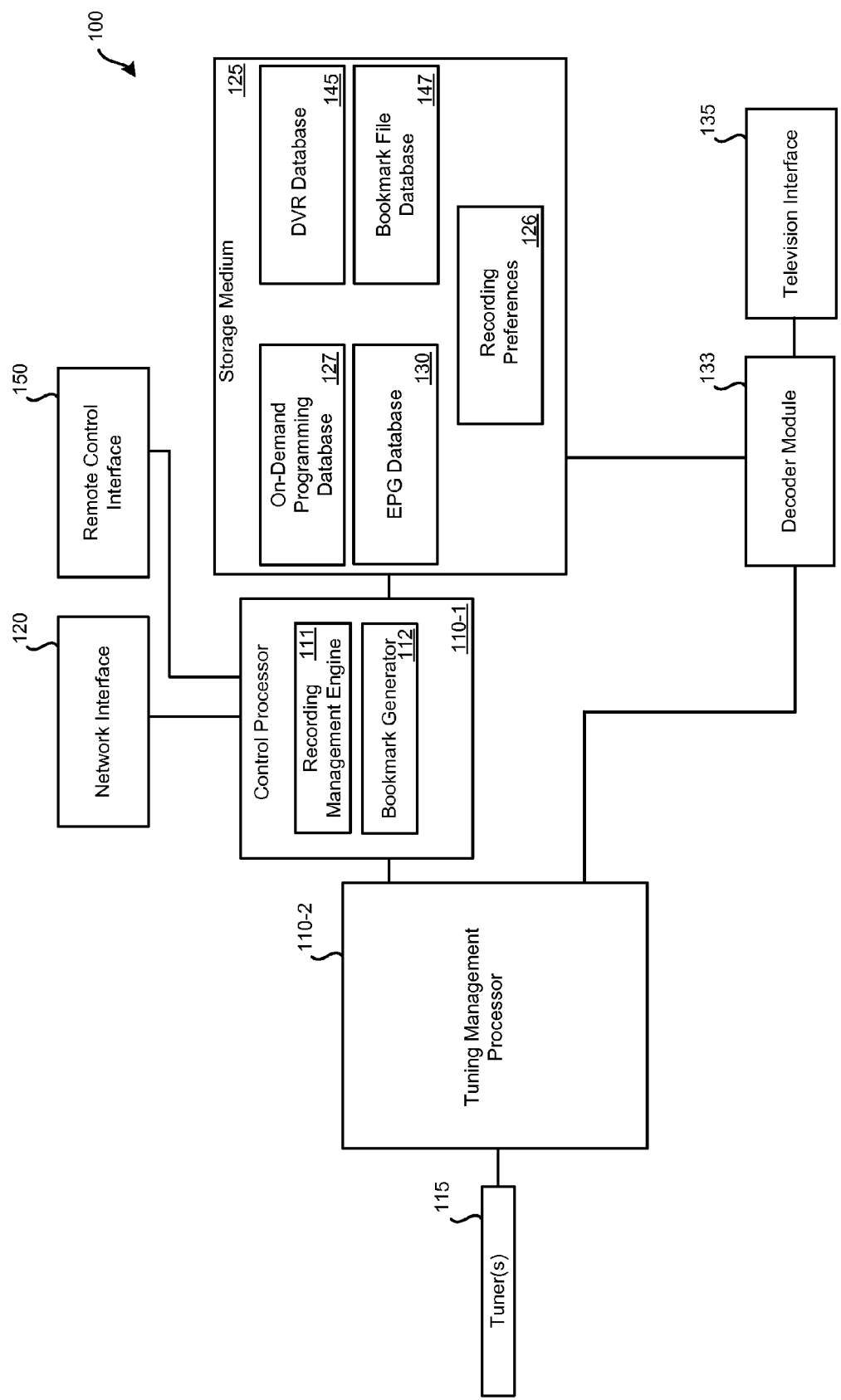
FIG. 1 illustrates an embodiment of a television receiver configured to use bookmarks for recording and playback of broadcast television programming.

When a user desires a television program to be recorded, the user may select the television program from an electronic programming guide (EPG) output for presentation by a television receiver. The EPG may allow a user to select various television programs appearing on multiple television channels. When a television program is selected for recording, a timer may be created that configures the television receiver to record a scheduled time period corresponding to the television program on the corresponding television channel.

While the television program is expected to be broadcast during the scheduled time period, the television program may begin being broadcast early or late, and/or the television program may run for significantly longer than originally expected (e.g., a sporting event that goes to overtime or extra innings). Therefore, it may be beneficial to extend the time period recorded by starting recording the television program significantly earlier and/or ending recording of the television program significantly later than the scheduled time period of the television program's broadcast. However, when time for playback, a user may find such an extended recording less desirable, especially if the television program was broadcast close to the originally scheduled broadcast time period. As an example, if the television program was originally scheduled to be broadcast from 8:00 to 8:30, the television receiver may record from 7:45 to 8:45 to ensure no part of the television program is missed from recording. However, at playback, the user may not desire to view the portion of the recording made from 7:45 to 8:00 if the television program began being broadcast as scheduled.

While it may be useful to have an expanded recording window to accommodate broadcast television programs that begin being broadcast early and/or end broadcast late, it may not be desirable to playback all of the recorded content unless necessary. As such, one or more bookmarks may be defined for the recorded file of the television program. Such bookmarks may define starting and/or ending points within the recorded television program (that is, the file recorded to based on the television program). A bookmark may define where playback begins within the file by default. For instance, returning to the previous example, recording may begin at 7:45, however the bookmark could define the default starting point for playback as 8:00 or slightly earlier, such as 7:57. If the television program began being broadcast at an earlier time, the earlier portion would have been recorded and the user may be able to access such earlier content by rewinding (or using some other form of trick-play movement in the file) to the appropriate point at which the user desires to commence viewing. A second bookmark may define where the television program ends (such as 8:30 in the previous example). Playback may be paused when the second bookmark is reached, a message may be presented, or playback may continue until the end of the file. Such a message may be presented a predefined amount of time after the second bookmark is reached, such as ten minutes later or an amount of time before the end of the file, and may indicate that the user can continue viewing until the end of the file but that the content the user is viewing may not be recorded in its entirety (e.g., such as when the television program initially selected for recording has ended and the user continues to view the next television program that was incidentally at least partially recorded as part of the same file).

FIG. 1 illustrates an embodiment of a television receiver configured to use bookmarks for recording and playback of broadcast television programming. Television receiver 100 may be in the form of a separate device configured to be connected with a presentation device, such as a television, monitor, projector, or other form of display. Embodiments of television receiver 100 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 100 may be incorporated as part of a television, such as a display device or presentation device. Television receiver 100 may include: processors 110 (which may include control processor 110-1, tuning management processor 110-2, and possibly additional processors), tuners 115, network interface 120, non-transitory computer-readable storage medium 125, on-demand programming database 127, electronic programming guide (EPG) database 130, television interface 135, digital video recorder (DVR) database 145 (which may include provider-managed television programming storage and/or user-defined television programming), recording preferences 126, bookmark database 147, and/or remote control interface 150. In other embodiments of television receiver 100, fewer or greater numbers of components may be present. It should be understood that the various components of television receiver 100 may be implemented using hardware, firmware, software, and/or some combination thereof.

Processors 110 may include one or more specialized and/or general-purpose processors configured to perform processes such as tuning to a particular channel, accessing and displaying EPG information from EPG database 130, and/or receiving and processing input from a user. It should be understood that the functions performed by various modules of FIG. 1 may be performed using one or more processors.

Control processor 110-1 may communicate with tuning management processor 110-2. Control processor 110-1 may control the recording of television channels based on timers stored in DVR database 145. Control processor 110-1 may also provide commands to tuning management processor 110-2 when recording of a television channel is to cease. In addition to providing commands relating to the recording of television channels, control processor 110-1 may provide commands to tuning management processor 110-2 that indicate television channels to be output to decoder module 133 for output to a display device. Control processor 110-1 may also communicate with network interface 120 and remote control interface 150. Control processor 110-1 may handle incoming data from network interface 120 and remote control interface 150. Additionally, control processor 110-1 may be configured to output data via network interface 120.

Control processor 110-1 may include recording management engine 111 and bookmark generator 112. Recording management engine 111 may be configured to set the start and end time of timers for recording broadcast television programs. A user may request that an EPG be presented. For instance, such a request may be received in the form of a command from a remote control via remote control interface 150. In response, control processor 110-1 may access EPG database 130 and output an EPG for presentation via television interface 135. In response to a selection of a television program indicated in the EPG as scheduled to be broadcast, a timer may be created and stored to storage medium 125. Recording management engine 111 may define the timer in accordance with various preferences (e.g., recording preferences 126) that may be set by the user and/or by the television service provider. Such preferences may define how much earlier recording should start prior to the scheduled time of a television program and how much after the scheduled end of a television program the recording should end. In some embodiments, the recording time may be varied based on a category of the content (which may be defined in metadata stored as part of EPG database 130). For instance, if a television program selected to be recorded is a sporting event, the ending time for the recording may be extended an extra hour (e.g., to accommodate sporting events that run significantly longer than expected).

Bookmark generator 112 may serve to create bookmarks and store such bookmarks, which may be made either part of the recording of a television program stored to DVR database 145 or as a separate, associated file stored to bookmark database 147. In some embodiments, bookmark generator 112 may insert metadata directly into the file created when recording a television program. The bookmark may indicate the locations in the file associated with the scheduled start and/or scheduled stop time of the recorded broadcast television program. In some embodiments, the bookmark is offset from the scheduled start and/or scheduled stop time of the television program, such as three minutes before the scheduled start time and three minutes after the scheduled stop time. In other embodiments, bookmarks are created for the television program separate from the recorded television program file. The separate bookmarks may be stored to a table as part of bookmark database 147. Such a table may store bookmark data for multiple recorded broadcast television programs. Alternatively, a separate bookmark file may be created for each recorded broadcast television program. A bookmark may be labeled as a start or end bookmark. Each bookmark may be tied to either a time or file size. For instance, if a time, the time may be indicative of how far into the associated file of the recorded television program the bookmark is located. If a file size, when the television program is being recorded, bookmark generator 112 may measure the file size of the file to which the television program is being recorded when the location at which the bookmark is located is reached during the recording process. This size value (e.g., in bytes) is then used to locate the bookmark for future reference.

Storage medium 125 may represent one or more non-transitory computer-readable storage mediums. Storage medium 125 may include memory and/or a hard drive. Storage medium 125 may be used to store information received from one or more satellites and/or information received via network interface 120. Storage medium 125 may store information for EPG database 130, DVR database 145, on-demand programming 127, recording preferences 126, and/or bookmark database 147.

Recording preferences 126 may be defined by the television service provider (e.g., to be uneditable by the user or set with default, editable values). Recording preferences 126 may define when timers start recording and/or end recording in relation to the scheduled start and end times of a television program selected to be recorded. Further, recording preferences 126 may define one or more offset times. An offset time may define where playback should begin in relation to a bookmark. For instance, if a bookmark is set for the scheduled start time of a television program, it may be desired that playback actually begin a defined number of minutes before or after the bookmark's indicated time. Recording preferences 126 may be specific by television channel, genre of the content (e.g., sporting event, news, sitcom, movie), and/or user.

Bookmark database 147 may be a single file that stores bookmark data for multiple recorded television programs or may include multiple files, with each bookmark file being specific to a recorded television program. Each bookmark file (or entry in the bookmark file) for a television program may indicate a start bookmark and an end bookmark. Such bookmarks may be indicative of or based off of the scheduled start and end times of the recorded broadcast television program. In some embodiments, a third warning bookmark is present that is indicative of the file about to end.

Tuners 115 may include one or more tuners used to tune to transponders that include broadcasts of one or more television channels. In some embodiments, two, three, or more than three tuners may be present, such as four, six, or eight tuners. Each tuner contained in tuners 115 may be capable of receiving and processing a single transponder stream from a satellite transponder (or from a cable network) at a given time. As such, a single tuner may tune to a single transponder stream at a given time. If tuners 115 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 115 may be used to receive the signal containing the multiple television channels for presentation and/or recording. Tuners 115 may receive commands from tuning management processor 110-2. Tuners 115 may also be used to receive EPG data and preview clips.

Network interface 120 may be used to communicate with a television service provider system (e.g., the provider that is distributing broadcast television programming). The primary communication channel may be via satellite, cable, IP-network, or over-the-air and the alternate communication channel may be via a network, such as the Internet. Data may be transmitted from television receiver 100 to a television service provider system and from the television service provider system to television receiver 100. Information may be transmitted and/or received via network interface 120.

Recorded television programs may be stored using storage medium 125 as part of DVR database 145. Storage medium 125 may be partitioned or otherwise divided (such as into folders) such that predefined amounts of storage medium 125 are devoted to storage of television programs recorded due to user-defined timers and stored television programs recorded due to provider-defined timers. DVR database 145 may be used to store television programs that were broadcast to the television receiver and received via a tuner of tuners 115. A timer may have been configured by either a user of television receiver 100 or by the television service provider to cause television receiver 100 to record a television program to DVR database 145. Such a timer may be recurring. Therefore, a timer may repeat on the same channel weekly. A broadcast television program refers to any television program that is distributed on a television channel to multiple television receivers. For instance, any television program appearing on the major networks (e.g., CBS, NBC) or other channel (e.g., USA, CNN, MTV, ESPN) is considered a broadcast television program for the purposes of this document.

It should be understood that in some embodiments, a DVR database may be maintained remotely from a television receiver. For instance, a cloud-based DVR database may be used. In such embodiments, based upon a user's selection of a television program, the television program may be recorded to the cloud-based database. Similarly, bookmark information may be stored to a cloud-based storage arrangement. For the various embodiments detailed herein, while focused on storage locally at a storage medium of the television receiver, such embodiments may be applied to cloud-based storage, which may be maintained by a television service provider or a third-party provider, accessible via a network connection.

EPG database 130 may store information related to television channels and the timing of programs appearing on such television channels. EPG database 130 may be stored using storage medium 125, which may be a hard drive or solid-state drive. Information from EPG database 130 may provide the user with a visual interface displayed by a television that allows a user to browse and select television channels and/or television programs for viewing and/or recording. Information used to populate EPG database 130 may be received via network interface 120, via satellite, cable, IP-network, or some other communication link with a television service provider. The information used to populate EPG database 130 may be expected to be accurate, however, at least some variance between the actual broadcast time of television programs and the scheduled time may occur, especially for sporting events that may have durations that are difficult to predict. Updates to EPG database 130 may be received periodically. EPG data, received from an EPG data host of the television service provider, may include information on television programming scheduled to be broadcast. For each television program, at least some of the following information may be stored: a television channel, a date, a time period, a description, a type, one or more associated genres, a rating, a listing of one or more actors/actresses, and/or an indication of a director. In addition to EPG data being stored for television programming to be broadcast, relevant EPG data may be stored for on-demand content and/or recorded content.

Decoder module 133 may serve to convert encoded video and audio into a format suitable for output to a display device. For instance, decoder module 133 may receive MPEG video and audio from storage medium 125 or tuning management processor 110-2 to be output to a television. MPEG video and audio from storage medium 125 may have been recorded to DVR database 145 as part of a previously-recorded television program. Decoder module 133 may convert the MPEG video and audio into a format appropriate to be displayed by a television or other form of display device and audio into a format appropriate to be output from speakers, respectively. Decoder module 133 may have the ability to convert a finite number of television channel streams received from storage medium 125 or from tuning management processor 110-2, simultaneously. For instance, decoders within decoder module 133 may be able to only decode a single television channel at a time. Decoder module 133 may have various numbers of decoders.

Television interface 135 may serve to output a signal to a television (or another form of display device) in a proper format for display of video and playback of audio. As such, television interface 135 may output one or more television channels, stored television programming from storage medium 125 (e.g., television programs from DVR database 145, television programs from on-demand programming 130 and/or information from EPG database 130) to a television for presentation. Television interface 135 may also serve to output a CVM.

Digital Video Recorder (DVR) functionality may permit a television channel to be recorded for a period of time. DVR functionality of television receiver 100 may be managed by control processor 110-1. Control processor 110-1, and, more specifically, recording management engine 111, may coordinate the television channel, start time, and stop time of when recording of a television channel is to occur. DVR database 145 may store information related to the recording of television channels. DVR database 145 may store timers that are used by control processor 110-1 to determine when a television channel should be tuned to and its programs recorded to DVR database 145 of storage medium 125. In some embodiments, a limited amount of storage medium 125 may be devoted to DVR database 145. Timers may be set by the television service provider and/or one or more users of television receiver 100.

DVR database 145 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 100 via the television provider's network. For example, in a satellite-based television service provider system, data necessary to create the provider-defined timers at television receiver 100 may be received via satellite.

On-demand programming database 127 may store additional television programming. On-demand programming database 127 may include television programming that was not recorded to storage medium 125 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 127 may be the same for each television receiver of a television service provider.

Remote control interface 150 may receive communications from a remote control (physically separate from television receiver 100) that allows a user to interact with television receiver 100. Remote control interface 150 may receive and send received commands to control processor 110-1, which may then process the commands. In some embodiments, it may be possible to load some or all preferences to a remote control. As such, the remote control can serve as a backup storage device for the preferences. In such embodiments, the communication link with the remote control via remote control interface 150 is bidirectional.

Tuning management processor 110-2 may be in communication with tuners 115 and control processor 110-1. Tuning management processor 110-2 may be configured to receive commands from control processor 110-1. Such commands may indicate when to start/stop receiving and/or recording of a television channel and/or when to start/stop causing a television channel to be output to a television. Tuning management processor 110-2 may control tuners 115. Tuning management processor 110-2 may provide commands to tuners 115 that instruct the tuners which satellite, transponder, and/or frequency to tune to. From tuners 115, tuning management processor 110-2 may receive transponder streams of packetized data. Video and/or audio may be output to storage medium 125 for storage (e.g., in DVR database 145) and/or to decoder module 133 for output to a television or other presentation equipment via television interface 135.

For simplicity, television receiver 100 of FIG. 1 has been reduced to a block diagram; commonly known parts, such as a power supply, have been omitted. Further, some routing between the various modules of television receiver 100 has been illustrated. Such illustrations are for exemplary purposes only. The state of two modules not being directly or indirectly connected does not indicate the modules cannot communicate. Rather, connections between modules of the television receiver 100 are intended only to indicate possible common data routing. It should be understood that the modules of television receiver 100 may be combined into a fewer number of modules or divided into a greater number of modules. Further, the components of television receiver 100 may be part of another device, such as built into a television. Television receiver 100 may include one or more instances of various computerized components, such as disclosed in relation to computer system 800 of FIG. 8.

While the television receiver 100 has been described primarily as a satellite receiver, it is to be appreciated that techniques below may be implemented in other types of television receiving devices, such a cable receivers, terrestrial receivers, IPTV receivers or the like. In some embodiments, the television receiver 100 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 2:
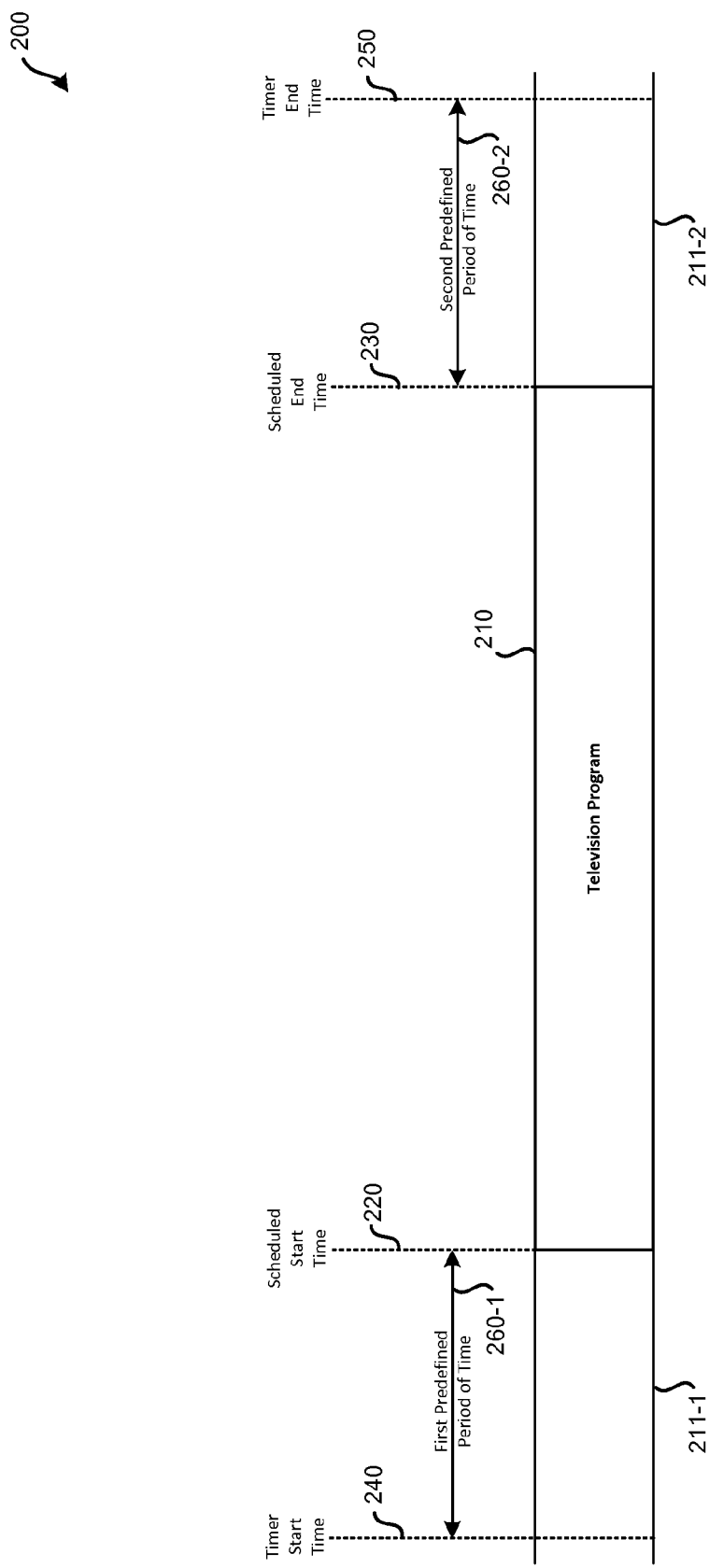
FIG. 2 illustrates an embodiment of a recording of a broadcast television program.

FIG. 2 illustrates an embodiment 200 of a recording of a broadcast television program. Television program 210 is an example of a television program that may be selected by a user via an EPG for recording via a timer. Content 211 represents content being broadcast before (211-1) and after (211-2) television program 210. Television program 210, as indicated by data stored to a television receiver's EPG database, has a scheduled start time 220 and a scheduled end time 230. Scheduled start time 220 and scheduled end time 230 define the time period during which television program 210 is expected to be broadcast by the television service provider. However, the actual broadcast of television program 210 may begin early and/or end late. For example, while television program 210 is scheduled to start at scheduled start time 220, at least a portion of television program 210 may be part of content 211-1 if television program 210 is broadcast earlier than scheduled. Similarly, for example, while television program 210 is scheduled to end at scheduled end time 230, at least a portion of television program 210 may be part of content 211-2 if television program 210 is broadcast later than scheduled or runs over its allocated time (e.g., a sporting event that goes longer in duration than expected).

Timer start time 240 may represent the time at which a timer is configured to start recording when television program 210 is selected to be recorded. In some embodiments, recording may begin 30 minutes or more prior to television program 210's scheduled start time. Timer start time 240 may be defined based on first predefined period of time 260-1. That is, first predefined period of time 260-1 may be used in conjunction with scheduled start time 220 to determine when timer start time 240 should occur. Timer end time 250 may represent the time at which a timer is configured to stop recording when television program 210 is selected to be recorded. Timer end time 250 may be defined based on second predefined period of time 260-2. In some embodiments, timer end time 250 is at least 30 minutes after television program's 210 scheduled end time. That is, second predefined period of time 260-3 may be used in conjunction with scheduled end time 230 to determine when timer end time 250 should occur. To the file which television program 210 is recorded, all content between timer start time 240 and timer end time 250 may be recorded. Using timer start time 240 and timer end time 250 may increase the likelihood that content not desired to be recorded by the user will be recorded, but decreases the chance that a portion of television program 210 will be accidentally not recorded (if television program 210 begins early and/or ends late).

In some embodiments, the duration of predefined periods of time 260 are set by the television service provider, while in other embodiments, the duration of predefined periods of time 260 are user-defined. A user may be permitted to edit default values set by the television service provider. The duration of first predefined period of time 260-1 may vary from the duration of second predefined period of time 260-2, or the durations may match. In some embodiments, the predefined periods of time 260 are varied based on the genre of television program 210, the television channel on which television program 210 is being broadcast, and/or some other predefined rule.

Figure 3:
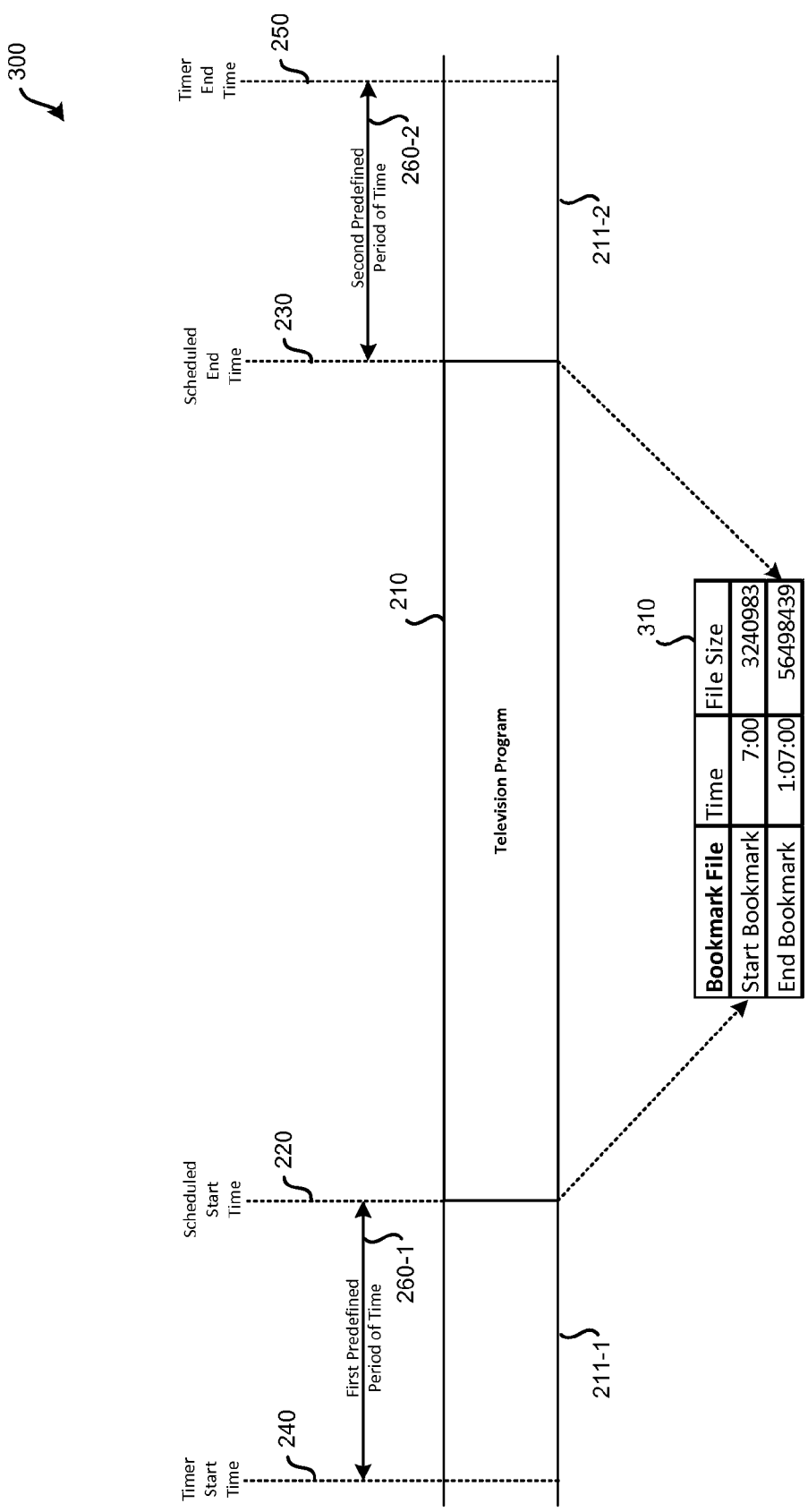
FIG. 3 illustrates an embodiment of a recording of a broadcast television program with a bookmark file.

FIG. 3 illustrates an embodiment 300 of a recording of a broadcast television program with an associated created bookmark file. Embodiment 300 may represent embodiment 200 of FIG. 2 with a bookmark file 310 (which may be stored as part of bookmark database 147 of FIG. 1). While, in some embodiments, bookmark file 310 may be stored in a separate file from the recording of television program 210, in other embodiments the data present in bookmark file 310 may be integrated as metadata into the file that stores the recording of television program 210. Further, it should be understood that bookmark information may be stored on a per-program basis or may be global. For instance, separate bookmark data may be stored for individual television programs, such as television program 210. Alternatively, global bookmark information may be stored that defines the bookmark locations for multiple recorded television programs in relation to the beginning and end of the recorded files.

Bookmark file 310 may be created during, before, or following the recording of television program 210. Bookmark file 310 may store data that indicates where playback will begin and/or end within the file used to record television program 210. Bookmark file 310 may store data indicative of where playback should begin and end within the file storing content between timer start time 240 and timer end time 250. To create bookmark file 310, the scheduled start time 220 and scheduled end time 230 may be used. According to bookmark file 310 in the illustrated embodiment, playback will run from scheduled start time 220 to scheduled end time 230. If a user wishes to edit this period of time (e.g., by rewinding to prior to scheduled start time 220), the user may be permitted to do so. Such an arrangement may decrease the amount of undesired content viewed by the user, but, if television program 210 started early, the user may be able to access and view the portion of television program 210 that began earlier than scheduled.

In embodiment 300, the start bookmark is set for scheduled start time 220 and the end bookmark is set for scheduled end time 230. In other embodiments, an offset may be used in conjunction with scheduled start time 220 and scheduled end time 230 to determine where within the file playback should begin and end. For instance, if a start offset of five minutes is defined, the start bookmark may refer to a point in the file five minutes before scheduled start time 220.

In some embodiments, bookmark file 310 defines times, in other embodiments, a file size is defined (or, in some embodiments, both). A time may indicate an amount of time after timer start time 240 to which the bookmark refers. If a file size is used, during the recording process, when the location of a bookmark is reached, a file size measurement may be made of the file to which television program 210 is being recorded. The measured file size (e.g., in bytes) may be stored and used as the location within the file for the bookmark. For instance, referring to embodiment 300, during recording when scheduled start time 220 is reached during the recording process, a file size measurement may be made to determine a location for the start bookmark.

In some embodiments, playback begins at a start bookmark (rather than the start of the file). In some embodiments, playback pauses when an end bookmark is reached. The user may then continue playback by submitting a command (e.g., pressing play on a remote control). In some embodiments, a message is presented in response to the end bookmark being reached. Such a message may warn the user that the file is going to end (e.g., an amount of time after the message). In other embodiments, the end bookmark does nothing or is not present. In some embodiments, more than two bookmarks may be present. For instance, a start bookmark, an end bookmark, and an end-of-file warning bookmark may be defined in bookmark file 310.

Figure 4:
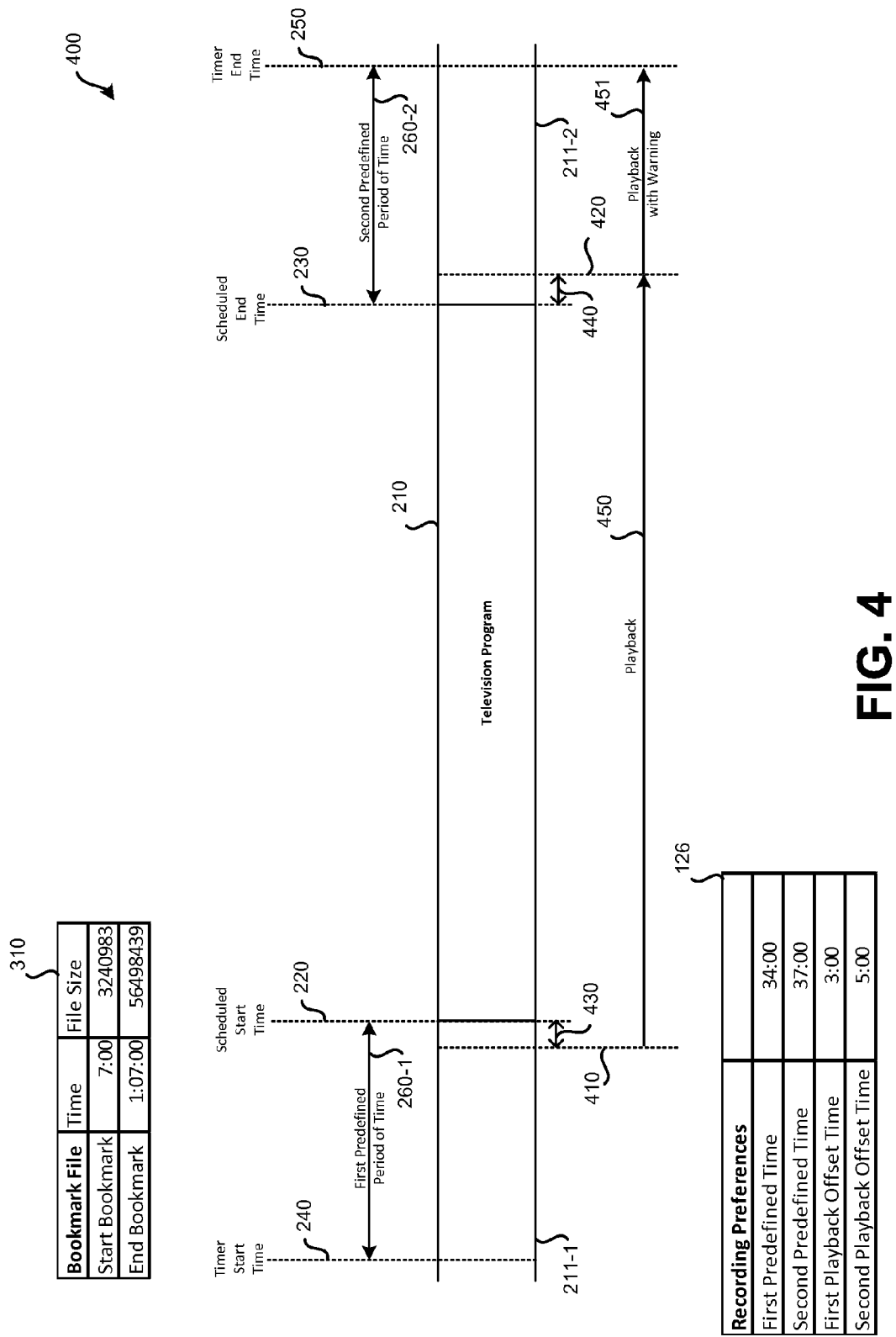
FIG. 4 illustrates an embodiment of a recording of a broadcast television program with a bookmark file and a preference file.

FIG. 4 illustrates an embodiment 400 of a recording of a broadcast television program with a bookmark file and a preference file. Embodiment 400 may represent a more detailed embodiment of embodiment 300 and/or embodiment 200. In embodiment 400, a bookmark file 310 is present. Additionally, recording preferences 126 are used. Recording preferences may define when timer start time 240 and timer end time 250 are to occur. In illustrated embodiment 400, timer start time 240 is configured to occur 34 minutes (which corresponds to first predefined period of time 260-1) before scheduled start time 220 and timer end time 250 is scheduled to occur thirty-seven minutes (which corresponds to second predefined period of time 260-2) after scheduled end time 230. Further, recording preferences 126 may be used to define when playback is configured to occur in relation to bookmarks of bookmark file 310. In the illustrated embodiment, a first playback offset time 430 (of, for example, three minutes), causes playback to start three minutes before the start bookmark at time 410. Further, in the illustrated embodiment, a second playback offset time 440 (of, for example, five minutes), causes playback to end (or pause or present a message) five minutes after the end bookmark at time 420.

Based on bookmark file 310 and recording preferences 126, playback of the file to which television program 210 was recorded may start at time 410 and run until time 420. At time 420, various events may occur. In some embodiments, playback may pause. By a user providing a command, playback may continue. In some embodiments, a warning may be presented, such as presented in FIG. 5. In some embodiments, playback may continue until timer end time 250 without any warning or pausing occurring. In some embodiments, a bookmark may be present a predefined amount of time prior to timer end time 250. This bookmark may be used to trigger presentation of a message that indicates that playback will be ending, such as in a certain number of minutes. If a warning message is presented at time 420, playback with warning 451 may occur. Such a warning may be viewed then dismissed by a user via a command. In some embodiments, the warning is presented for only or up to a predefined period of time, then is removed from presentation.

It should be understood that playback offset times may be modified by a user after recording but prior to playback. As such, if a user feels that playback is beginning within files too late, the user can modify recording preferences 126 to make the predefined times be in accordance with what the user would prefer.

Figure 5:
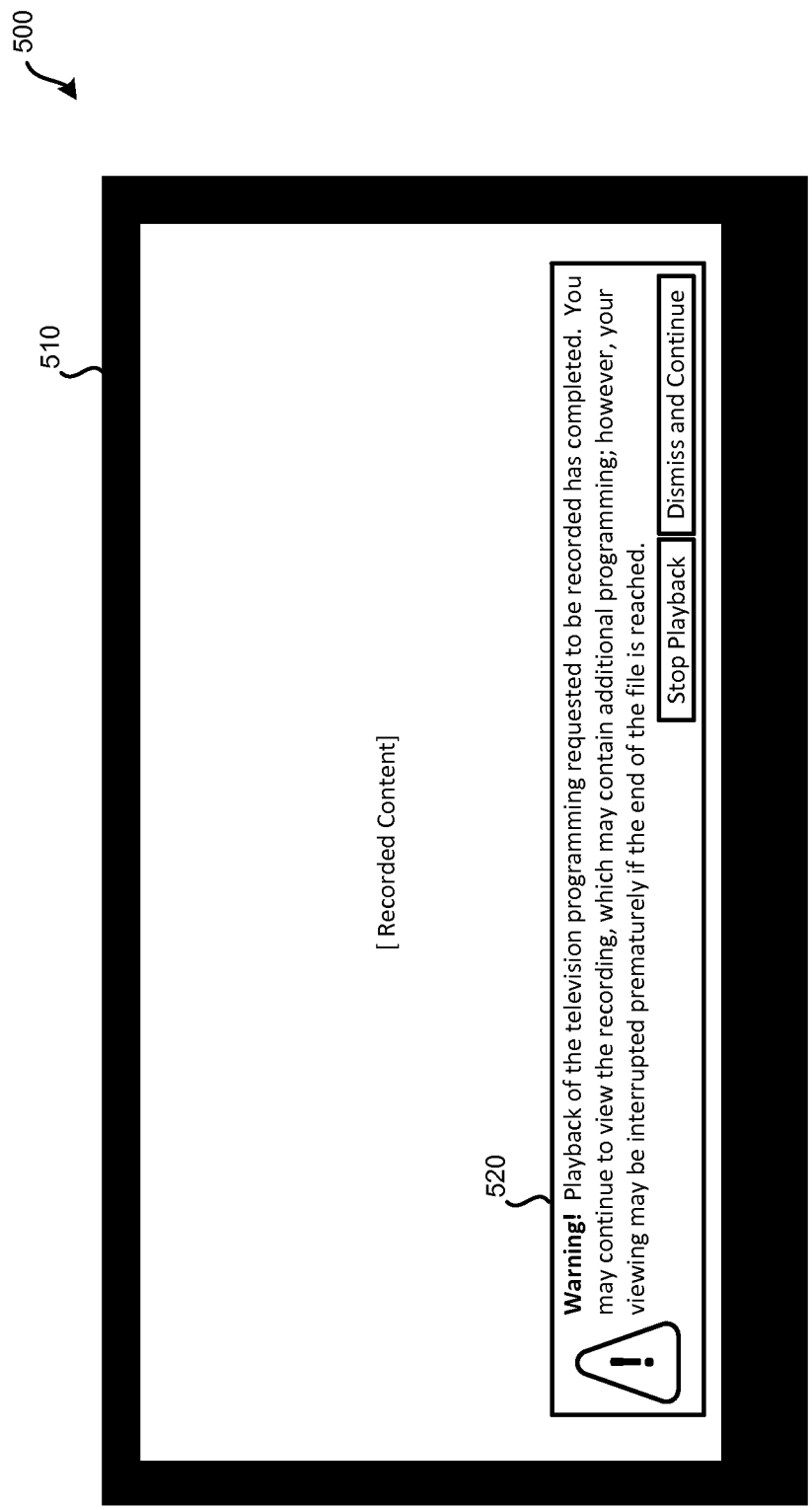
FIG. 5 illustrates an embodiment of a message output by a television receiver for presentation based on a bookmark.

FIG. 5 illustrates an embodiment 500 of a message output by a television receiver for presentation based on a bookmark. In embodiment 500, a presentation device 510 to which television receiver 100 of FIG. 1 is connected, presents a warning message 520 based on the output of the television receiver. This warning message 520 may indicate to a user that it is likely that the television program intended to be recorded has ended playback. Therefore, before getting engrossed in the next television program that was incidentally recorded as part of the same file as the television program, the user should be aware that the entire next television program may not be recorded. The user may then have the option to continue playback or stop playback. In some embodiments, warning message 520 may automatically dismiss after a predefined period of time has elapsed.

Figure 6:
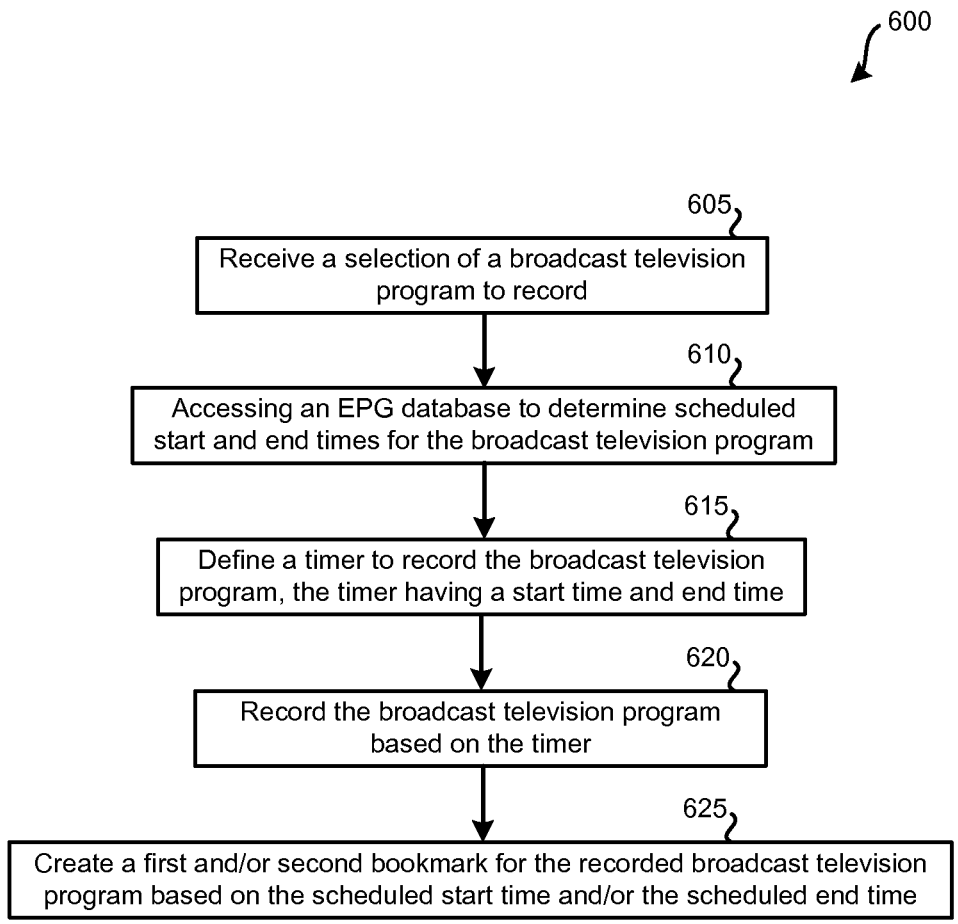
FIG. 6 illustrates an embodiment of a method for recording a broadcast television program.

Various methods may be performed using a television receiver, such as television receiver 100 of FIG. 1. The embodiments of FIGS. 2-5 of recording television programs may be implemented using television receiver 100. FIG. 6 illustrates an embodiment of a method 600 for recording a broadcast television program. Method 600 may be implemented using television receiver 100 or some alternate embodiment of a television receiver to implement one or more of the embodiments of FIGS. 2-4. Further, the television receiver, which may be television receiver 100, used to implement method 600 may be computerized and may include one or more instances of some or all of the components discussed in relation to computer system 800 of FIG. 8.

At step 605, a selection or other form of indication of a broadcast television program to record may be received by a television receiver. The television program may be scheduled to broadcast on a television channel during a specified time period. The selection may be made by a user, such as via a remote control, in communication with a television receiver. In some embodiments, the television service provider may provide a command to the television receiver that selects or otherwise indicates a television program for recording.

At step 610, an EPG database that is stored by the television receiver may be accessed to determine details about the television program selected to be recorded. The details determined may include a channel, scheduled start time, and a scheduled end time. In some embodiments, a genre (e.g., sporting event, movie, sitcom) or other categorical information about the television program may also be determined from the EPG database. At step 615, a timer may be defined to record the television program based on the indicated television channel, scheduled start time, and scheduled end time. The timer may be stored by the television receiver and used to initiate reception and recording of the television program at a later time. The timer may be based off of the scheduled start time and end time of the scheduled programming, however the start and end times of the timer may be based off various preferences and other setting that define an expanded recording period, such as detailed in relation to FIGS. 2-4. For example, referring to embodiment 400 of FIG. 4, timer start time 240 may be first predefined period of time 260-1 before scheduled start time 220 and timer end time 250 may be second predefined period of time 260-2 after scheduled end time 230. In some embodiments, the genre of the television program to be recorded affects the start and/or end time of the timer. At step 615, the genre may be assessed and used to set the start and/or end time of the timer. Such a genre may also affect where bookmarks are set within the file created for the recording.

At step 620, the broadcast television program selected at step 605 is recorded from the broadcast on the appropriate television channel. The timer begins at the timer start time and ends at the timer end time. The television program is recorded to a file. It should be understood that the television program may begin being broadcast earlier than scheduled and/or may end being broadcast later than scheduled. At step 625, either before, during, or after the broadcast television program has been recorded at step 620, at least a first bookmark is created. The first bookmark may correspond to the scheduled start time. In some embodiments, the first bookmark may be temporally before or after the scheduled start time. The first bookmark may be located based on an amount of time measured from the timer start or may be based off of the scheduled start time. As previously detailed, the bookmark may be defined as a time (e.g., into playback of the file) or a byte count (which involves measuring the file during recording when the location to which the bookmark refers to reached in the recording process). The bookmark may be stored as metadata to the same file as the broadcast television program or may be stored to a separate file. This separate file may be created specifically for the recording of the television program or may be part of a database of bookmarks for multiple recordings. In some embodiments, the file(s) associated with the recording of the television program may be stored locally by the television receiver or may be stored via a network to a remote storage device (e.g., to a "cloud" storage server accessible via the Internet).

In some embodiments, a second bookmark may be created. The second bookmark may correspond to the scheduled end time of the broadcast television program. The second bookmark may also appear a time before or after the scheduled end of the broadcast television program. The second bookmark may be located based on an amount of time measured from the timer start time, timer end time, or may be based off of the scheduled end time. As previously detailed, the bookmark may be defined as a time (e.g., into playback of the file) or a byte count (which involves measuring the file during recording when the location to which the bookmark refers to is reached in the recording process). The second bookmark may be stored similarly to the first bookmark. In some embodiments, a third bookmark is present. Such a third bookmark may be present a defined amount of time before the end of the file to which the broadcast television program is recorded, such as 10 minutes before the end of the file. This bookmark may be used to trigger a warning to a user (television viewer) that the file is nearing its end. Such a warning may be useful to prevent a user from becoming engrossed in a later-broadcast television program that was incidentally partially recorded as part of the same file as the television program selected to be recorded at step 605.

In some situations, such extended recording may cause the amount of storage space allocated for recording to become full. In some embodiments, when the amount of storage space allocated for recording reaches a threshold (e.g., 97% full), the amount of content recorded prior to and/or after a recorded television program may be trimmed or entirely deleted. If trimmed, stored bookmarks could be modified to compensate for the trimming.

In some embodiments, the television receiver may keep track, for each program, of where the user skipped back to or fast forwarded to and began playback, The television receiver may also keep track of where the user stopped playback, presumably at the end of the television program. These points may act as an indication of the actual start and end times of the television program. If the television receiver is connected to a network, this information can be sent to a server operated by the television service provider. As such, based on information from multiple television receivers, the television service provider can determine accurate start and/or end times by effectively "cloud sourcing" this information from the television receivers, such as by using median start and/or stop values. Subsequent playback of the same television program at another television receiver could be improved if the television receiver queries the television service provider's server to receive information indicate of where playback should begin and/or end according to the crowd-sourced data. As such, possibly only a handful of users may need to do any skipping or stopping. For other users, start and stop of playback may begin at the appropriate locations. In some embodiments, once such information regarding the start and/or stop time has been determined, the recorded content may be trimmed such that content not associated with the television program is deleted, thus saving storage space.

Figure 7:
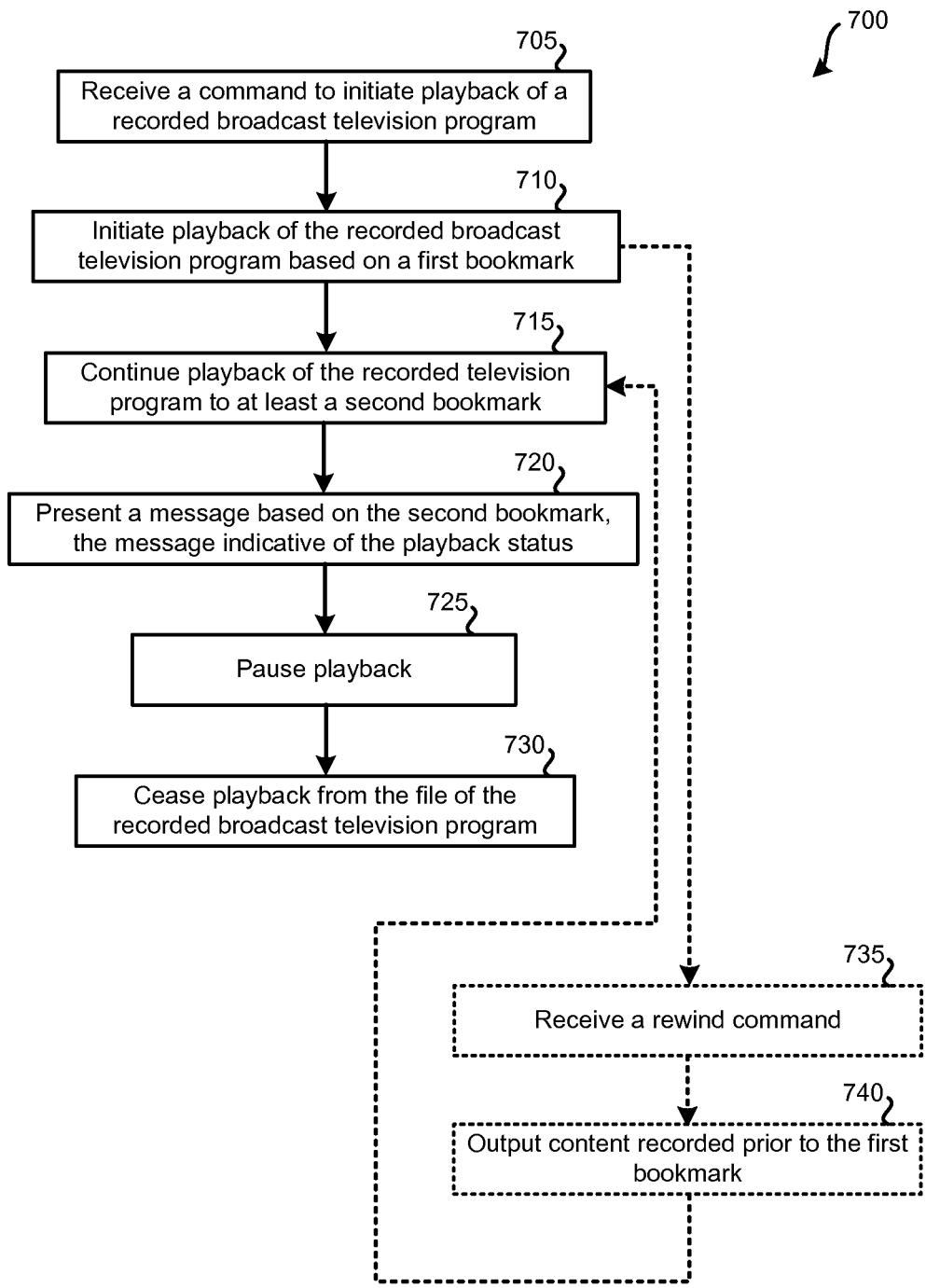
FIG. 7 illustrates an embodiment of a method for playback of a broadcast television program.

FIG. 7 illustrates an embodiment of a method for playback of a broadcast television program. Method 700 may be implemented using television receiver 100 or some alternate embodiment of a television receiver to implement one or more of the embodiments of FIGS. 2-4. Further, the television receiver, which may be television receiver 100, used to implement method 700 may be computerized and may include one or more instances of some or all of the components discussed in relation to computer system 800 of FIG. 8. Method 700 may be performed for playback of a broadcast television program recorded in accordance with method 600 of FIG. 6 or some other method that allows for creation of bookmarks for use in conjunction with a recorded broadcast television program.

At step 705, a command to initiate playback of a recorded broadcast television program may be received by the television receiver that stores the recorded broadcast television program. In some embodiments, the recorded broadcast television program may be accessible via a network ("the cloud"). As such, the television receiver may stream or download the recorded broadcast television program for playback. The command may be provided by a user, such as via a remote control in communication with the television receiver.

At step 710, playback of the recorded broadcast television program may be initiated. Playback may begin based on the first bookmark rather than at the timer start time. For example, referring to embodiment 300 of FIG. 3, playback may begin at the scheduled start time 220 based on a start bookmark. As such, a portion of the file is skipped, at least initially, from playback. In some embodiments, the first bookmark is offset from the scheduled start time, such as several minutes before or after the scheduled start time. In embodiment 400 of FIG. 4, an offset time is used to start playback several minutes before the bookmark. Alternatively, the offset time may be enforced during the recording process such that the bookmark appears at time 410 rather than an offset being measured from the bookmark at playback. As previously detailed, offsets, timer start times, and timer end times may be defined in accordance with recording preferences, which are stored by the television receiver and may be modified by a user. In some embodiments, playback may begin a fixed offset byte count into a file, which may eliminate the need for a bookmark to be used to define where playback is to begin. Also, such recording preferences may vary based on the genre of the television program selected to be recorded. For example, if a sports program was determined to be selected for recording, the timer end time may be extended an hour.

In some situations, a user may desire to rewind from the start position for playback associated with the first bookmark. For instance, if the recorded television program began broadcast early, the user may desire to rewind within the file to the start of the television program. Therefore, at step 735, a rewind command may be received from the user (e.g., via a remote control). Other forms of trick-play commands are also possible (e.g., skip back to start of file, etc.). At step 740, at least some content recorded to the file that appears prior to the location in the file indicated by the bookmark may be output for presentation. From step 740, method 700 may return to step 715.

If playback is initiated without any rewind command being issued by the user, method 700 may proceed to step 715. At step 715, playback of the recorded television program continues to at least the second bookmark. In some embodiments, the second bookmark is offset from the scheduled end time, such as several minutes before or after the scheduled end time. In embodiment 400 of FIG. 4, an offset time is used to pause playback several minutes after the second bookmark. Alternatively, the offset time may be enforced during the recording process such that the second bookmark appears at time 420 rather than an offset being measured from the second bookmark at the time of playback. In some embodiments, the second bookmark triggers a message to be presented at step 720. The message may indicate that the end of the file will be reached in an approximate number of minutes. A message as presented in FIG. 5 may be presented. Additionally or alternatively, the second bookmark may trigger playback to pause at step 725. In some embodiments, at step 725, a message will be presented to the user asking if the user desires to continue playback. The user may continue playback by providing a play command. In some embodiments, rather than a second bookmark triggering the message at step 720, the message is triggered by a third bookmark (which may appear a predefined number of minutes prior to the timer end time) that indicates the file will end in approximately a certain number of minutes. At step 730, if playback has been continued by the user, the playback ceases at the timer end time because no further recorded content is available.

Figure 8:
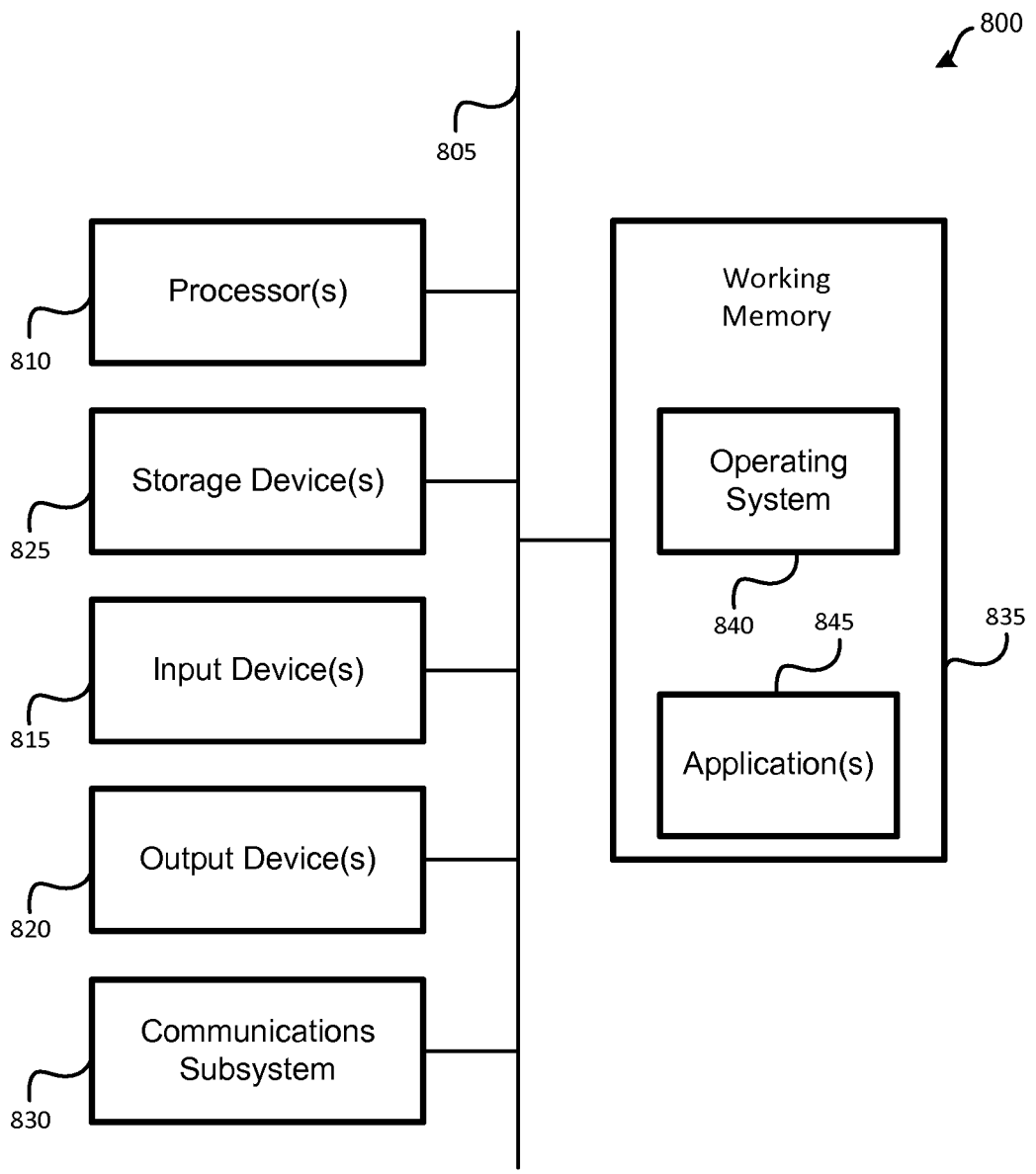
FIG. 8 illustrates an embodiment of a computer system.

FIG. 8 illustrates an embodiment of a computer system. A computer system as illustrated in FIG. 8 may be incorporated as part of the previously described computerized devices, such as television receiver 100. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for recording broadcast television programming, the method comprising:

receiving, by a television receiver, a selection of a broadcast television program from an electronic programming guide;

accessing, by the television receiver, an electronic programming guide database to determine a scheduled start time and a scheduled end time for the broadcast television program;

defining, by the television receiver, a timer to record the broadcast television program in response to receiving the selection of the broadcast television program from the electronic programming guide, wherein:
  a start time for the timer is a first predefined period of time before the scheduled start time of the broadcast television program; and
  an end time for the timer is a second predefined period of time after the scheduled end time of the broadcast television program;

recording the broadcast television program as a recording, the recording beginning at the start time of the timer and ending at the end time of the timer;

creating and storing a first bookmark in association with the recording, the first bookmark being based on the scheduled start time of the broadcast television program;

receiving, by the television receiver, a command requesting playback of the recorded broadcast television program; and initiating, by the television receiver, playback of the recorded broadcast television program at a location determined by the television receiver within the recording that is:
  determined based on a stored predefined playback offset being subtracted from the first bookmark's location;
  located before the first bookmark based on the scheduled start time of the broadcast television program; and
  located after the start time of the timer.

2. The method for recording broadcast television programming of claim 1, the method further comprising:
  defining, by the television receiver, for the recorded broadcast television program, a second bookmark that indicates the scheduled end time of the broadcast television program.

3. The method for recording broadcast television programming of claim 2, the method further comprising:
  continuing, by the television receiver, playback of the recorded television program to the scheduled end time indicated by the second bookmark; and
  while continuing playback of the recorded television program, outputting, by the television receiver, based on the second bookmark, for presentation a visual indication that playback will end.

4. The method for recording broadcast television programming of claim 2, the method further comprising:
  continuing, by the television receiver, playback of the recorded television program until the scheduled end time indicated by the second bookmark;
  at the scheduled end time indicated by the second bookmark, pausing, by the television receiver, playback of the recorded television program; and
  outputting, by the television receiver, for presentation, a user interface indicating whether playback of the recorded television program is to continue.

5. The method for recording broadcast television programming of claim 1, the method further comprising:

after initiating playback of the recorded broadcast television program at the location, receiving a rewind command; and in response to the rewind command, outputting a portion of the recorded broadcast television program that is prior to the location.

6. The method for recording broadcast television programming of claim 1, wherein a user defines the first predefined period of time and the second predefined period of time.

7. The method for recording broadcast television programming of claim 1, wherein the first predefined period of time and the second predefined period of time are of a same duration.

8. The method for recording broadcast television programming of claim 1, wherein storing the first bookmark comprises storing the first bookmark to a file separate from the recorded broadcast television program.

9. A system for recording broadcast television programming, the system comprising:
  one or more processors; and
  a memory communicatively coupled with and readable by the one or more processors and having stored therein processor-readable instructions which, when executed by the one or more processors, cause the one or more processors to:
  receive a selection of a broadcast television program from an electronic programming guide;
  access an electronic programming guide database to determine a scheduled start time and a scheduled end time for the broadcast television program;
  define a timer to record the broadcast television program in response to receiving the selection of the broadcast television program from the electronic programming guide, wherein:
    a start time for the timer is a first predefined period of time before the scheduled start time of the broadcast television program; and
    an end time for the timer is a second predefined period of time after the scheduled end time of the broadcast television program;
  record the broadcast television program as a recording, the recording beginning at the start time of the timer and ending at the end time of the timer;
  create and store a first bookmark in association with the recording, the first bookmark being based on the scheduled start time of the broadcast television program;
  receive a command requesting playback of the recorded broadcast television program; and
  initiate playback of the recorded broadcast television program at a location determined by the television receiver within the recording that is:
    determined based on a stored predefined playback offset and the first bookmark;
    located before the first bookmark based on the scheduled start time of the broadcast television program; and
    located after the start time of the timer.

10. The system for recording broadcast television programming of claim 9, wherein the processor-readable instructions, when executed, further cause the one or more processors to:
  define, for the recorded broadcast television program, a second bookmark that indicates the scheduled end time of the broadcast television program.

11. The system for recording broadcast television programming of claim 10, wherein the processor-readable instructions, when executed, further cause the one or more processors to:
continue playback of the recorded television program to the scheduled end time indicated by the second bookmark; and
while continuing playback of the recorded television program, output, based on the second bookmark, for presentation a visual indication that playback will end.

12. The system for recording broadcast television programming of claim 10, wherein the processor-readable instructions, when executed, further cause the one or more processors to:
continue playback of the recorded television program until the scheduled end time indicated by the second bookmark;
at the scheduled end time indicated by the second bookmark, pause playback of the recorded television program; and
output, for presentation, a user interface indicating whether playback of the recorded television program is to continue.

13. The system for recording broadcast television programming of claim 9, wherein the processor-readable instructions, when executed, further cause the one or more processors to:
after initiating playback of the recorded broadcast television program at the location, receive a rewind command; and
in response to the rewind command, output a portion of the recorded broadcast television program that is prior to the location.

14. A non-transitory processor-readable medium for recording broadcast television programming, comprising processor-readable instructions configured to cause one or more processors to:
receive a selection of a broadcast television program from an electronic programming guide;
access an electronic programming guide database to determine a scheduled start time and a scheduled end time for the broadcast television program;
define a timer to record the broadcast television program in response to receiving the selection of the broadcast television program from the electronic programming guide, wherein:
a start time for the timer is a first predefined period of time before the scheduled start time of the broadcast television program; and
an end time for the timer is a second predefined period of time after the scheduled end time of the broadcast television program;
record the broadcast television program, the recording beginning at the start time of the timer and ending at the end time of the timer;
create and store a first bookmark in association with the recording, the first bookmark being based on the scheduled start time of the broadcast television program;
receive a command requesting playback of the recorded broadcast television program; and
initiate playback of the recorded broadcast television program at a location determined by the television receiver within the recording that is:
determined based on a stored predefined playback offset and the first bookmark;
located before the first bookmark based on the scheduled start time of the broadcast television program; and
located after the start time of the timer.

15. The non-transitory processor-readable medium for recording broadcast television programming of claim 14, wherein the processor-readable instructions are further configured to cause the one or more processors to:
define, for the recorded broadcast television program, a second bookmark that indicates the scheduled end time of the broadcast television program.

16. The non-transitory processor-readable medium for recording broadcast television programming of claim 15, wherein the processor-readable instructions are further configured to cause the one or more processors to:
continue playback of the recorded television program to the scheduled end time indicated by the second bookmark; and
while continuing playback of the recorded television program, output, based on the second bookmark, for presentation a visual indication that playback will end.

17. A method for recording broadcast television programming, the method comprising:
receiving, by a television receiver, a selection of a broadcast television program from an electronic programming guide;
accessing, by the television receiver, an electronic programming guide database to determine a scheduled start time and a scheduled end time for the broadcast television program;
defining, by the television receiver, a timer to record the broadcast television program in response to receiving the selection of the broadcast television program from the electronic programming guide, wherein:
a start time for the timer is a first predefined period of time before the scheduled start time of the broadcast television program; and
an end time for the timer is a second predefined period of time after the scheduled end time of the broadcast television program;
recording the broadcast television program, the recording beginning at the start time of the timer and ending at the end time of the timer;
create and store a first bookmark in association with the recording, the first bookmark being based on the scheduled start time of the broadcast television program;
initiating playback, by the television receiver, at a byte count into the recording based on a defined offset value being subtracted from a first bookmark, the byte count is:
before the first bookmark based on the scheduled start time of the broadcast television program; and after the start time of the timer.

* * * * *